United States Patent [19]

Ugon

[11] Patent Number: 5,825,875
[45] Date of Patent: *Oct. 20, 1998

[54] PROCESS FOR LOADING A PROTECTED STORAGE ZONE OF AN INFORMATION PROCESSING DEVICE, AND ASSOCIATED DEVICE

[75] Inventor: Michel Ugon, Maurepas, France

[73] Assignee: CP8 Transac, France

[ * ] Notice: This patent issued on a continued prosecution application filed under 37 CFR 1.53(d), and is subject to the twenty year patent term provisions of 35 U.S.C. 154(a)(2).

[21] Appl. No.: 540,787

[22] Filed: Oct. 11, 1995

[30] Foreign Application Priority Data

Oct. 11, 1994 [FR] France ................................. 94 12100

[51] Int. Cl.⁶ ............................. H04L 9/10; H04K 1/00
[52] U.S. Cl. .................................. 380/4; 380/23; 380/25; 235/382
[58] Field of Search ................................ 380/23, 24, 25, 380/4; 395/186, 187.01, 188.01; 340/825.31, 825.34; 235/380, 382, 382.5

[56] References Cited

U.S. PATENT DOCUMENTS

| | | | |
|---|---|---|---|
| 4,215,421 | 7/1980 | Giraud | 380/25 |
| 4,558,175 | 12/1985 | Genest et al. | 380/21 |
| 4,731,841 | 3/1988 | Rosen et al. | 380/23 |
| 4,802,218 | 1/1989 | Wright et al. | 380/23 |
| 4,926,280 | 5/1990 | Chaum | 380/23 |
| 5,036,461 | 7/1991 | Elliott et al. | 395/244 |
| 5,288,978 | 2/1994 | Iijima | 380/23 X |
| 5,311,595 | 5/1994 | Bjerrum et al. | 380/25 |
| 5,381,478 | 1/1995 | Iijima | 380/44 |
| 5,461,217 | 10/1995 | Claus | 235/380 |
| 5,577,121 | 11/1996 | Davis et al. | 380/24 |
| 5,602,915 | 2/1997 | Campana et al. | 380/21 |
| 5,623,547 | 4/1997 | Jones et al. | 380/24 |

FOREIGN PATENT DOCUMENTS

| | | |
|---|---|---|
| 8801818 | 3/1988 | European Pat. Off. . |
| 0440800 | 8/1991 | European Pat. Off. . |

*Primary Examiner*—Thomas H. Tarcza
*Assistant Examiner*—Pinchus M. Laufer
*Attorney, Agent, or Firm*—Kerkam, Stowell, Kondracki & Clarke, P.C.; Edward J. Kondracki

[57] ABSTRACT

The invention relates to a process for loading a protected storage zone of an information processing device, with confidential data and/or programs, and to the associated information processing device.

The information processing device (1) includes a module (8) that includes a non-volatile memory having a protected zone (11) which is read-write accessible to a processing means (9) inside the module, but is at least write-protected from outside the module. The process executes a transfer of confidential information to the protected zone (11) from an analogous protected zone (27) of a portable object (21) with a structure similar to that of the module. The portable object is received in a portable object reader (6) which is provided in the information processing device.

12 Claims, 2 Drawing Sheets

PROCESS FOR LOADING A PROTECTED STORAGE ZONE OF AN INFORMATION PROCESSING DEVICE, AND ASSOCIATED DEVICE

CROSS-REFERENCE TO RELATED APPLICATIONS

The subject matter of U.S. Pat. No. 4,382,279 and U.S. Pat. No. 4,211,919 is hereby incorporated by reference.

FIELD OF THE INVENTION

The invention relates to a process for loading an information processing device which comprises information processing means, a memory, means for cooperating with a first portable object, and a module that comprises information processing means and a nonvolatile memory a protected zone which is read/write accessible to the processing means but is at least write-protected from outside the module. The information processing device is operatively associated with a first portable object including information processing means and a nonvolatile memory having a protected zone which is read/write accessible to the processing means, but is at least write-protected from outside the portable object, the protected zone of the first portable object containing data and or programs.

BACKGROUND OF THE INVENTION

The chief concern in loading an information processing device of this type is the loading of the module, since by its very structure, this module is designed to contain confidential data or programs in the protected zone of its memory.

In a known device of this type, the module itself is a portable object which cooperates with the device by means of a portable object reader. In this case, the module is loaded independently of the device, during an initial phase for customizing the module which is carried out at an authorized facility. In the secured environment of this facility, loading the module does not pose any particular problem.

On the other hand, loading the protected zone of the module without compromising confidential data when the module has already been installed in the processing device is trickier, particularly when this device itself has previously been installed outside the premises of the authorized facility, in an unsecured environment.

SUMMARY OF THE INVENTION

A first object of the invention is to propose a process for loading the protected zone of the module in a secure manner, whether or not it is removable, and whether or not the environment in which the loading is carried out has been secure throughout the life of the processing device.

To this end, the invention relates to the process described at the beginning of the disclosure, characterized in that it comprises the steps which consist of making the processing device cooperate with the first portable object and of transferring the data and/or programs originating from the protected zone of the first portable object to the protected zone of the module.

Thus, according to the invention, secure loading of the module is obtained by establishing a dialogue between this module and an external portable object, which has the same secure structure as the module, and by executing a transfer of confidential information between their respective protected zones.

A second aspect of the invention relates to a process for for providing service provision that requires the intervention of the first portable object and a second portable object, which comprises information processing means and a nonvolatile memory having a protected zone which is read/write accessible to the processing means, but is at least write-protected from outside the portable object, the protected zone containing data and/or programs, the data and/or programs contained in the protected zones of the first and second portable objects defining their respective access rights and required operations as to this service provision.

For example, the functions of authentication of the portable objects, data encryption, or even certification or signature of the information in the portable objects require the use of secondary portable objects which contain secrets correlated to the secrets of the principal portable objects.

This is particularly the case with payment applications in which it is possible to send a random number to both of the objects and to compare the results of a calculation which is carried out in each object on the basis of a protected key and an appropriate cryptographic algorithm. When the two results are identical, it may be deduced that the secondary portable object has authenticated the principal portable object. The process can be carried out in both directions in order to obtain a mutual authentication.

In this case, it is necessary to have two portable electronic objects and accordingly, machines or apparatuses which are capable of creating an interface between the two objects. These apparatuses must therefore include two channels for communicating with the two objects and in particular two connection systems, which will increase the costs and storage requirements and reduce the reliability of the equipment.

A complementary object which the invention seeks to attain is to avoid the simultaneous presence of two devices for reading the portable objects in the apparatuses.

According to the invention, the processing device is made to cooperate with the first portable object in order to transfer the data and/or programs originating from the protected zone of the first portable object into the protected zone of the module; the processing device is then made to cooperate with the second portable object, and the process proceeds to deliver the service using the data and/or programs transferred into the module and those contained in the second portable object.

The invention also relates to an information processing device designed to implement the above mentioned process.

BRIEF DESCRIPTION OF THE DRAWING(S)

Other details and advantages of the invention will appear in the following description according to a preferred but non-limiting form of embodiment with regard to the appended documents, in which:

FIG. 1 represents a diagram of the information processing device according to the invention and two portable objects intended to cooperate with this device in succession; and FIG. 2 defines a set of operations relative to a particular application of the invention.

DESCRIPTION OF THE PREFERRED EMBODIMENTS

Figure 1:
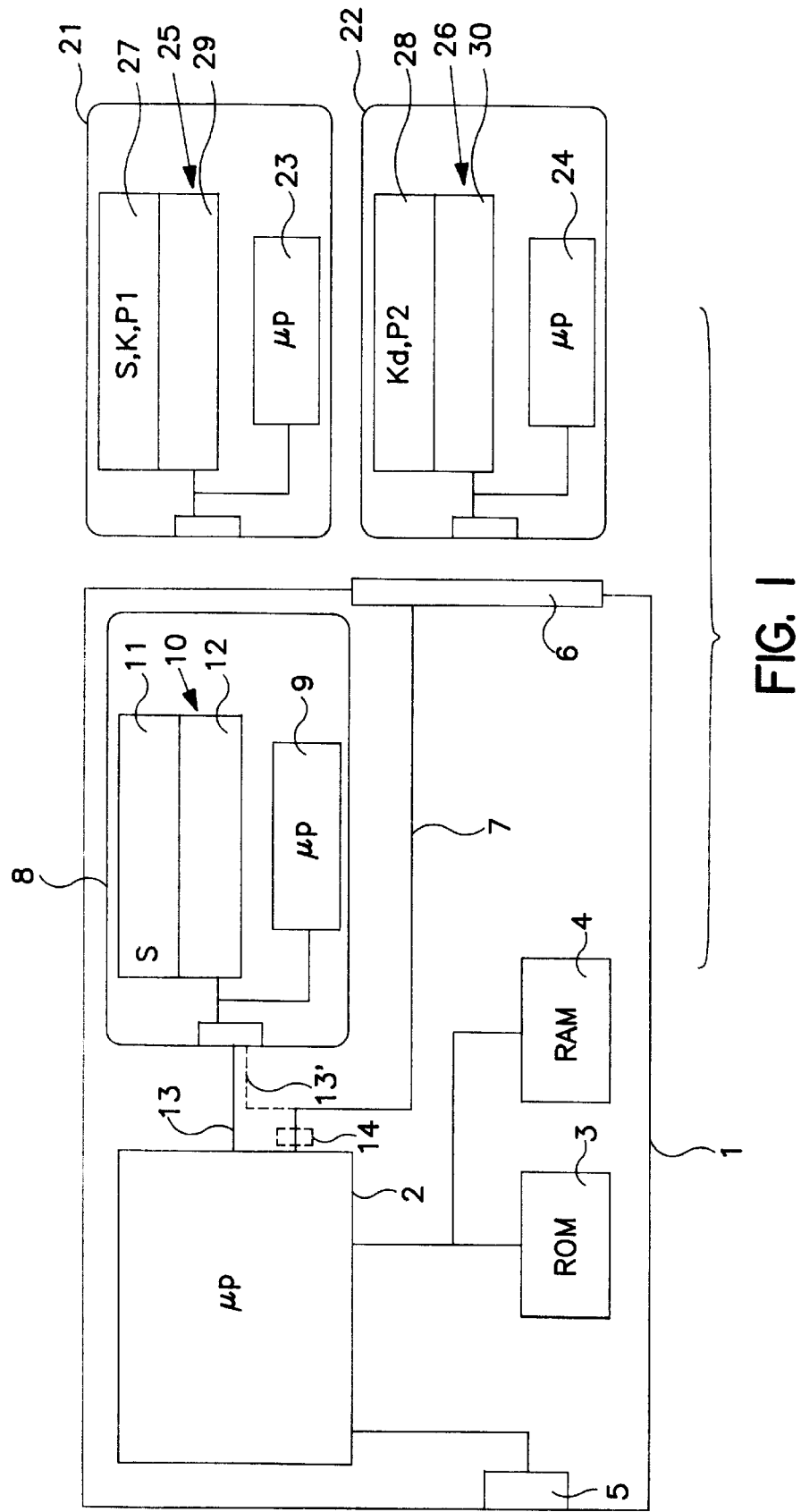

The information processing device 1 represented in FIG. 1 includes, in a known manner, a microprocessor 2 to which are connected a ROM memory 3, a RAM memory 4, and a transmission interface 5 which allows the device to communicate with another similar device, either directly or through a communication network. It also includes a portable object reader 6, for example like that described in French patents 2 461 301 and 2 401 459 and their corresponding U.S. Pat. Nos. 4,382,179 and 4,211,919 respectively. Reader 6 is connected to the microprocessor 2 by a transmission line 7.

The device 1 can also be equipped with storage means such as removable or non-removable diskettes or disks, data entry means (such as a keyboard and/or a mouse-type pointing device), and display means; For simplicity and clarity of presentation, these various means are not shown in FIG. 1.

Furthermore, the device 1 includes an electrical module 8, hereinafter called a transfer module, which includes information processing means 9 and an associated nonvolatile memory 10. This module is disposed so as to define, in the memory 10, a secret zone 11 in which information, once recorded, is inaccessible from outside the module and is accessible only to the processing means 9, and an open zone 12 which is read-write accessible from outside the module. Each storage zone can include a non-erasable ROM part and an erasable EPROM or EEPROM part or a part constituted by a "flash"-type RAM memory, that is, a part which has the characteristics of a EEPROM memory but with access times which are identical to those of a standard RAM. A volatile RAM memory, which is not represented, is also provided.

Among other things, a microprocessor with an autoprogrammable nonvolatile memory, like that described in the aforenoted U.S. Pat. No. 4,382,279 could be used as the module 8. As indicated on page 1, lines 5 through 17 of this patent, the autoprogrammable characteristic of the memory corresponds to the possibility for a program $f_i$ located in this memory to modify another program $f_j$ also located in this memory into a program $g_j$. Although the implementing means for carrying out this autoprogramming could vary depending on the technology used to design the information processing means 9, it will be recalled that, in the case in which these processing means are constituted by a microprocessor associated with a nonvolatile memory according to the above-mentioned patent, these means can include:

buffers for data and addresses, associated with the memory, a write program loaded into the memory which contains, in particular, the instructions which allow the maintenance of the memory programming voltage on one hand, and the maintenance of the data that are to be written and their addresses on the other hand, for a sufficient length of time, although this write program can nevertheless be replaced by a write controller with logic circuits.

In a variant of the invention, the microprocessor of the module 8 is replaced by logic circuits implanted in a semiconductor chip. In fact, circuits of this type are able to carry out calculations, particularly authentication and signature calculations, thanks to hard-wired, non-microprogrammed electronics. The Siemens component marketed under the name SLE 4436 and the SGS-Thomson component marketed under the name ST 1335 may be cited as examples.

Preferably, the module 8 is in monolithic form on a single chip. It is connected to the microprocessor 2 by a transmission line 13 which connects directly to the microprocessor, or by a transmission line 13' which connects to the transmission line 7 of the portable object reader 6, as represented by a dotted line in FIG. 1.

From a physical standpoint, the module 8 could be associated with the information processing device 1 in various ways. First of all, it could be designed to be completely integrated into the device, for example disposed on a plate inside the device which supports a set of electronic components, or even on the same chip as the device. It could also be designed as a detachable, added element which could be inserted and removed. For example, it will be carried, either removably or non-removably, by a mass memory card, equipped with a connector in accordance with the PCMCIA (Personal Computer Memory Card International Association) standard, which is plugged into a corresponding connector of the information processing device 1, the latter connector being located, for example, between the microprocessor 2 and the junction point between the transmission lines 7, 13' (the dotted line with the reference number 14).

The processing device 1 is intended to cooperate with two portable objects 21, 22 as defined above in relation to the portable object reader 6. Each of them is equipped with an electronic module which has the same structure as the module 8 associated with the processing device 1 and therefore has, respectively information processing means 23, 24, a nonvolatile memory 25, 26 which includes a protected zone 27, 28 and an open zone 29, 30 and self-programming means.

In a variant, the secret zone of the transfer module 8 and/or of the two portable objects is complemented or replaced by a zone whose security level is lower than that of the secret zone. More precisely, this zone is not only read-write accessible to the processing means of the transfer module or portable objects, but is also read-accessible—but not write-accessible—from outside the module or the objects. In the present disclosure, "protected zone" designates either a secret zone which is inaccessible from the outside, or a zone which is only read-accessible from the outside. In a zone which is read-accessible from the outside, it is possible to store, in particular, the public key of a public key algorithm, or various data or programs. In a secret zone, secret keys, in particular, are stored.

The process according to the invention involves, first of all, a phase for customizing the transfer module 8 of the processing device 1 and the two portable objects 21, 22 which is carried out by the authorization facility. By way of example, the following procedure could be used. The same protected key S is disposed in the respective protected zones 11, 27 of the transfer module 8 and the first portable object 21, which will, in particular, allow the portable object to authenticate the transfer module. Furthermore, a protected mother key K is disposed in the protected zone 27 of the first portable object, and a protected key Kd which is diversified from the key K is disposed in the protected zone 28 of the second portable object, these two keys making it possible, in particular, for the first portable object to authenticate the second. For example, the diversified key Kd is obtained by executing a calculation by means of a specific cryptographic algorithm which takes into account the mother key K and a diversification parameter which is characteristic of the second portable object. If necessary, the protected key S could also be subject to a diversification procedure.

In the protected zones 27, 28 of the two portable objects, respectively, there are also two programs P1 and P2 linked to the application in question and which define, in particular, the rules for allocating one or the other service provision.

The invention applies to the implementation of a procedure linked to the service in question, which requires the simultaneous presence of both portable objects 21, 22. To this end, at least certain access rights written into the portable object 21 will be copied into the transfer module 8.

In a first step, the portable object 21 is inserted into the portable object reader 6, and along with the transfer module 8 it implements a mutual authentication procedure so as to verify that they are both actually authorized to intervene in the delivery of the service in question. For example, the portable object generates a random number E and sends it to the transfer module, which executes a calculation based on its protected key S and this random number E and sends a result R of the calculation to the portable object 21. This object executes the same calculation on its end, based on its protected key S and the same random number E, to produce a result R', and compares the two results R, R'; if they are identical, the portable object considers the transfer module to be authenticated. A procedure of this type is described, in particular, in French patent 2 601 795 in the name of the present Applicant.

The procedure described above relates to the authentication of the transfer module 8 by the portable object 21. In the reverse direction, the transfer module 8 could authenticate the portable object 21 using an analogous procedure, in which case the comparison of the results R, R' would take place in the transfer module.

Once the mutual authentication has been confirmed, the transfer module 8 and the portable object 21 can exchange either unencrypted information, or information in encrypted form using an encryption key Sc; in the latter case, the encryption key can be calculated by the transfer module and the portable object in a known manner from an algorithm F contained in their protected storage zones 11, 27, from their common protected key S, and from a random number Ec generated by either the module or the object and transmitted to the other of these two devices. The encryption of the information by one of the devices uses the encryption key Sc and an encryption algorithm G, and the other device decrypts the information received by means of the same parameters or by means of a key and an encryption algorithm correlated to them.

In a known manner, the procedure may require the carrier of the portable object 21 to authenticate itself by presenting a confidential code to this object by means of a keyboard of the processing device 1, a code which is compared with a reference code contained in the protected storage zone 27 of the object.

A second step of the procedure according to the invention consists of transferring all the parameters necessary to the delivery of the service in question from the portable object 21 to the transfer module 8. The protected key K and the program P1, in particular, are transferred into the protected storage zone 11 of the transfer module 8, and they will allow this module, along with the second portable object 22, to carry out any operation which requires the use of this key and this program.

It may prove necessary to limit the period during which the transfer module 8 will exert the access rights which will have been transmitted to it by the first portable object 21. To this end, the transfer module 8 will incorporate, in its protected zone 11, a program which is disposed so as to inhibit its operation when a predetermined limit, transmitted by the first portable object 21, has been reached. This may involve, in particular, an operating time which elapses from the moment when the transfer of access rights has occurred, or after a number of transactions, the definition of a transaction being predetermined by the system and being able to correspond to a specific service provision unit or to a session, which is a period that runs from the moment when the second portable object 22 is inserted into the processing device 1 to the moment when it is removed. At the end of the authorized utilization period, the transfer module will be inhibited and will only be able to be restarted by the insertion of a portable object which is capable of unlocking it, such as the first portable object 21, into the reader 6.

Figure 2:
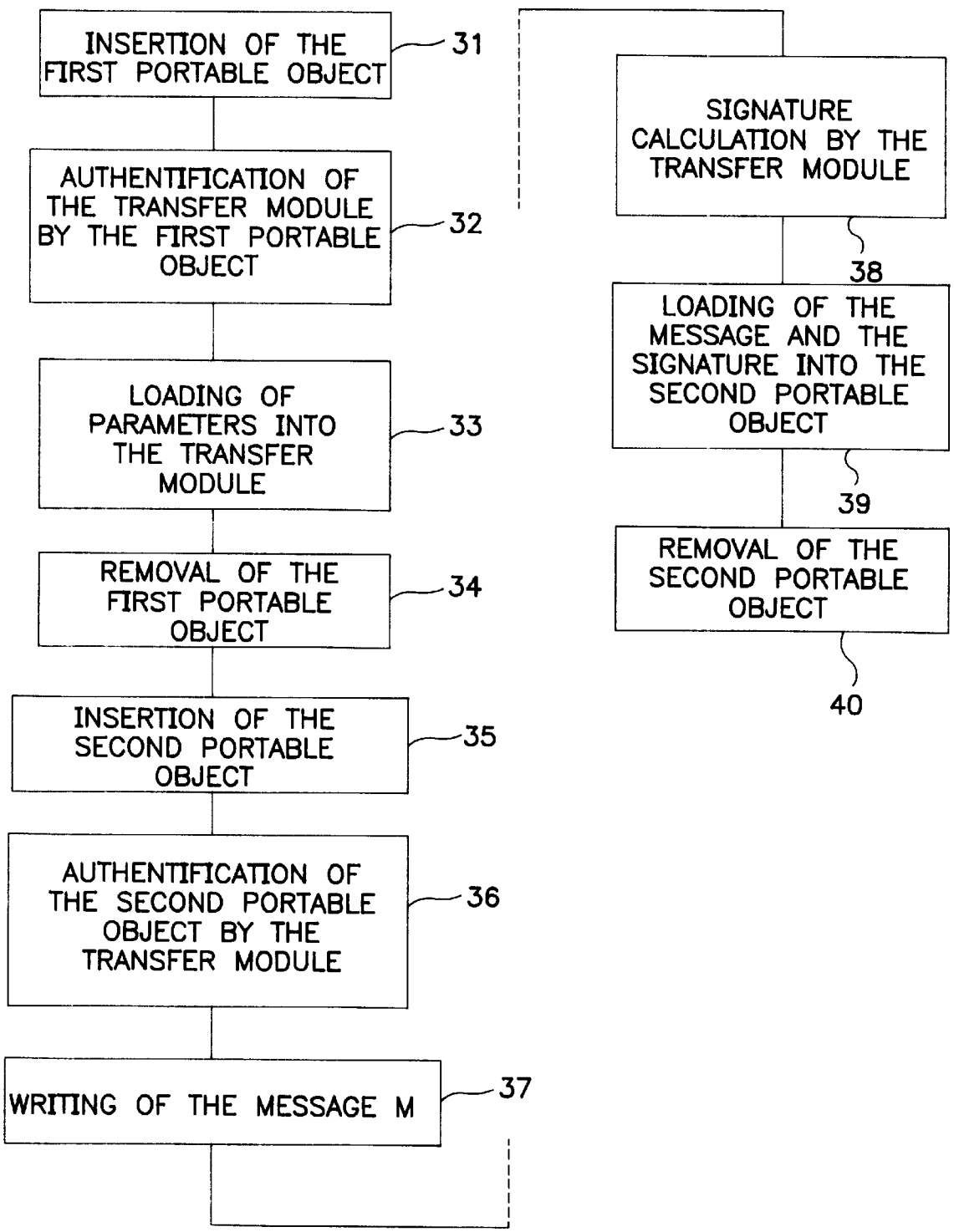

FIG. 2 illustrates one possible application of the invention in which a message M, written using the data entry means of the processing device 1, must be signed by the first portable object 21, and the message M with its signature SG must be introduced into the second portable object 22.

In a first step 31, the first portable object 21 is inserted into the portable object reader 6 of the processing device 1. In the next step 32, the first portable object 21 authenticates the transfer module 8 in the manner described previously. Once an authentication has been confirmed, the first portable object 21 loads its protected key K and its program P1 into the protected zone 11 of the transfer module (step 33). Then, the first portable object 21 is removed from the processing device 1 (step 34) and the second portable object 22 is inserted in its place (step 35).

The authentication of the second portable object 22 by the transfer module involves the key K received by the module and the key Kd of the portable object. It is executed in the manner indicated previously. To this end, the transfer module, upon receiving a diversification parameter originating from the portable object, will have to recalculate the diversified key Kd of the portable object from its mother key K. Then, even if the message M is already present in the memory of the processing device 1 this message is introduced into the processing device by the carrier of the first portable object 21, for example by the data entry means of this device (step 37). The editing of the message M may involve the programs P1 and P2.

In the next step 38, the transfer module 8 calculates the signature SG of the message M, a signature which inseparably links the contents of the message with the identity of its emitter, which in this case is the protected key K of the first portable object 21. In practice, the transfer module incorporates into its protected storage zone 11 a signature calculating algorithm H which is either there permanently or has been transferred by the first portable object 21. The algorithm H, which takes into account the message M—preferably in a shortened form—and the protected key K of the first portable object 21, calculates a result which constitutes this signature SG.

In step 39, the message M and its signature SG are transferred into the memory 26 of the second portable object 22. This object is then removed from the processing device 1 (step 40).

In conclusion, it appears that the process according to the invention has therefore made it possible to make the two portable objects 21, 22 cooperate with the processing device 1 in a common procedure, using only the one transmission line 7 which connects the portable object reader 6 to the microprocessor 2 of the processing device.

It will be noted that the algorithms for producing a diversified key Kd or an encryption key Sc for encrypting a piece of information and for calculating a signature could be constituted by the same algorithm.

Although symmetrical protected-key algorithms have been presented above, it would of course be possible to take advantage of asymmetrical public-key algorithms, in such a way that at least one of the portable objects or the transfer module incorporates a public key instead of a secret key. For example, the authorized facility initially disposes a signature in the second portable object 22 which, thanks to the algorithm, is calculated as a function of a datum for identifying this object and a secret key, the authentication of this object by the transfer module 8 causing the intervention of a corresponding public key to verify this signature, this public key initially being in the memory of the first portable object 21.

Among the various applications of the invention, it is possible to cite its application to the health field, in which the protected key K defines the access rights of a doctor, and the protected key Kd those of a patient, the process according to the invention allowing the doctor to introduce into the portable object 22 of the patient a message constituted by a prescription with which the signature of the doctor is associated, a signature which is verifiable by any facility which has the public keys correlated to the secret keys K, Kd.

In the case in which the dialogue with the second portable object 22 would require the simultaneous involvement of the access rights of several first portable objects 21, the necessary access rights of these various first portable objects 21 would be successively loaded into the transfer module 8 by inserting these objects one by one into the reader 6. Then the dialogue between the transfer module 8 and the second portable object 22 would be established.

The invention is also applicable in the case in which the first portable object 21 communicates with the processing device 1 remotely by means of a remote data processing line or telephone line connected to the transmission interface, rather than locally by means of the portable object reader 6. The process according to the invention makes it possible to free up this line once the transfer of information between the first portable object and the processing device has been executed, in order to allocate it to other tasks during which the two portable objects 21, 22 will dialogue with one another.

Furthermore, the invention applies not only in the case of a dialogue between the portable objects while the processing device is off line, but also in the case in which the processing device is on line in order to dialogue with a remote device which delivers or intervenes in the desired service provision.

I claim:

1. A process for executing in an information processing device secure operations which require holding rights held by a first portable object, the information processing device comprising device processing means and device memory means for performing general nonsecure operations, and incorporating a security module which comprises module processing means and module memory means for performing specific secure operations, said module memory means being nonvolatile and read-write accessible to said module processing means but at least write-protected from outside the module, said first portable object comprising first object processing means and first object memory means for performing specific secure operations, said first object memory means being nonvolatile and read-write accessible to said first object processing means but at least write-protected from outside the first portable object, said rights being stored in said first object memory means, the process comprising the steps of:

establishing communication between said first portable object and said information processing device;

copying said rights from said first object memory means to said module memory means under control of said module processing means;

stopping communication between said first portable object and said information processing device;

using the information processing device in lieu of the first portable object within a predetermined limit of use to perform said secure operations which require possessing said rights, by requesting the information processing device to derive said rights from said security module; and inhibiting operation of said module under the control of said security module processing means when said predetermined limit of use has been reached.

2. The process as claimed in claim 1, wherein said first portable object memory means stores an object key, and said module memory stores a first module key correlated to the object key, wherein said step of copying rights from said first object memory means to said module memory means is executed only if a mutual cryptographic procedure based on said object key and first module key is successfully performed.

3. The process as claimed in claim 1, wherein said first object memory means stores an encryption key and an encryption algorithm while the module memory means stores a decryption key and a decryption algorithm respectively correlated to said encryption key and encryption algorithm, further comprising the steps of:

encrypting said rights of said first portable object with said encryption key and encryption algorithm in the first portable object before copying;

decrypting said rights of first portable object with said decryption key and decryption algorithm in the module memory means after copying.

4. A process for executing secure operations between a first portable object and a second portable object which require holding rights held by the first portable object by using an information processing device, the information processing device comprising device processing means and device memory means for performing general nonsecure operations, and incorporating a security module which comprises module processing means and module memory means for performing specific secure operations, said module memory means being nonvolatile and read-write accessible to module processing means but at least write-protected from outside the module, said first and second portable objects comprising respective first and second object processing means and first and second object memory means for performing specific secure operations, said first and second object memory means being nonvolatile and read-write accessible to first and second object processing means respectively but at least write-protected from outside the first and second portable objects respectively, said rights being stored in said first and second object memory means respectively, the process comprising the steps of:

establishing communication between said first portable object and said information processing device;

copying said rights from said first object memory means to said module memory means under the control of said module processing means;

stopping communication between said first portable object and said information processing device;

using the information processing device in lieu of the first portable object to perform said secure operations by cooperating with said second portable object and by requesting the information processing device to derive said rights from said module.

5. The process as claimed in claim 4, wherein said first object memory means stores an object key, and said module memory means stores a first module key correlated to the object key, wherein said step of copying rights from said first object memory means to said module memory means is executed only if a mutual cryptographic procedure based on said object key and first module key is successfully performed.

6. The process as claimed in claim 4, wherein said first object memory means store an encryption key and an encryption algorithm while the module memory means store a decryption key and a decryption algorithm respectively correlated to said encryption key and encryption algorithm, further comprising the steps of:

encrypting said rights of said first portable object with said encryption key and encryption algorithm in the first portable object before copying;

decrypting said rights of the first portable object with said decryption key and decryption algorithm in the module after copying.

7. The process of claim 4, for establishing a dialogue between the first and the second portable objects which requires the utilization of said rights of said first and said second portable objects, wherein, once the second portable object is cooperating with the information processing device, the module and the second portable object are connected using said rights of said first and second portable objects.

8. The process of claim 7, wherein said rights copied from said first portable object to said module comprise a first object key, and said rights of said second portable object comprise a second object key correlated to the first object key, and said dialogue comprises implementing a mutual cryptographic procedure based on said two object keys.

9. An information processing system for performing secure operations which require holding rights held by a first portable object, said system having an information processing device, the information processing device comprising device processing means and device memory means for performing general nonsecure operations, reader means for cooperating with a portable object, and incorporating a security module which comprises module processing means and module memory means for performing specific secure operations, said module memory means being nonvolatile and read-write accessible to module processing means but at least write-protected from outside the module, said first portable object comprising first object processing means and first object memory means for performing specific secure operations, said first object memory means being nonvolatile and read-write accessible to first object processing means but at least write-protected from outside the first portable object, said rights being stored in said first object memory means, said device processing means comprising:

means for triggering and controlling a communication between said module and said first portable object through said reader means;

means for copying said rights from said first object memory means to said module memory means under the control of said module processing means;

means for stopping communication between first portable object and information processing device;

means for performing said secure operations within a predetermined limit of use which require possessing said rights, by deriving said rights from said module in lieu of the first portable object; and means for inhibiting operation of said module under the control of said module processing means when said predetermined limit of use has been reached.

10. The device as claimed in claim 9, wherein said device processing means comprise a program contained in said device memory means.

11. An information processing system for executing secure operations between a first portable object and a second portable object which require holding rights held by the first portable object said system having an information processing device, the information processing device comprising device processing means and device memory means for performing general nonsecure operations, reader means for cooperating with a portable object, and incorporating a security module which comprises module processing means and module memory means for performing specific secure operations, said module memory means being nonvolatile and read-write accessible to module processing means but at least write-protected from outside the module, said first and said second portable objects comprising respective first and second object processing means and first and second object memory means for performing specific secure operations, said first and said second object memory means being nonvolatile and read-write accessible to first and second object processing means, respectively, but at least write-protected from outside the first and the second portable objects, respectively, said rights being stored in said first and said second object memory means respectively, said device processing means comprising:

means for triggering and controlling a communication between said module and said first portable object through said reader means;

means for copying said rights from said first object memory means to said module memory means under the control of said module processing means;

means for stopping communication between first portable object and information processing device;

means for performing said secure operations, by cooperating with said second portable object and by deriving said rights from said module and said second portable object is in lieu of the first portable object.

12. The device as claimed in claim 11, wherein said device processing means comprise a program contained in said device memory means.

* * * * *

UNITED STATES PATENT AND TRADEMARK OFFICE
CERTIFICATE OF CORRECTION

PATENT NO. : 5,825,875
DATED : October 20, 1998
INVENTOR(S) : Michel Ugon

It is certified that error appears in the above-indentified patent and that said Letters Patent is hereby corrected as shown below:

Col. 8, Cl. 4, line 30, delete "between a first portable object and a second portable object"

Col. 8, Cl. 4, line 32, delete "the" and replace with --a--

Col. 8, Cl. 4, line 32, after "object" please insert --and a second portable object--

Col. 8, Cl. 4, line 65, after "module" please insert --and said second portable object--

Col. 10, Cl. 11, line 20, after "object" please insert --and the second portable object.--

Col. 10, Cl. 11, line 53, delete "is"

Signed and Sealed this

Fourteenth Day of September, 1999

*Attest:*

Q. TODD DICKINSON

*Attesting Officer*   Acting Commissioner of Patents and Trademarks